United States Patent
Lahiri et al.

(10) Patent No.: US 10,199,040 B2
(45) Date of Patent: Feb. 5, 2019

(54) METHOD AND APPARATUS FOR AUTOMATIC SPEECH RECOGNITION

(71) Applicant: OXFORD UNIVERSITY INNOVATION LIMITED, Oxford (GB)

(72) Inventors: Aditi Lahiri, Oxford (GB); Henning Reetz, Oxford (GB); Philip Roberts, Oxford (GB)

(73) Assignee: OXFORD UNIVERSITY INNOVATION LIMITED, Oxford (GB)

( * ) Notice: Subject to any disclaimer, the term of this patent is extended or adjusted under 35 U.S.C. 154(b) by 0 days.

(21) Appl. No.: 15/105,552

(22) PCT Filed: Dec. 17, 2014

(86) PCT No.: PCT/IB2014/067023
§ 371 (c)(1),
(2) Date: Jun. 16, 2016

(87) PCT Pub. No.: WO2015/092711
PCT Pub. Date: Jun. 25, 2015

(65) Prior Publication Data
US 2016/0322046 A1      Nov. 3, 2016

(30) Foreign Application Priority Data
Dec. 18, 2013   (GB) .................................. 1322377.1

(51) Int. Cl.
*G10L 15/02*       (2006.01)
*G10L 15/08*       (2006.01)
(Continued)

(52) U.S. Cl.
CPC ............ *G10L 15/187* (2013.01); *G10L 15/02* (2013.01); *G10L 15/04* (2013.01); *G10L 25/75* (2013.01);
(Continued)

(58) Field of Classification Search
CPC .............................. G10L 15/02; G10L 15/08
See application file for complete search history.

(56) References Cited

U.S. PATENT DOCUMENTS 4,803,729 A      2/1989   Baker
4,980,918 A *  12/1990   Bahl ....................... G10L 15/08
                                                              704/240
(Continued)

FOREIGN PATENT DOCUMENTS

EP         2387031         11/2011

OTHER PUBLICATIONS

Henning Reetz 'Underspecified Phonological Features for Lexical Access' Phonus: Reports in Phonetics, University of Saarland. Jan. 1, 2000 pp. 161-173.
(Continued)

*Primary Examiner* — Samuel G Neway
(74) *Attorney, Agent, or Firm* — Symbus Law Group, LLC; Clifford D. Hyra (57) ABSTRACT

A method of automatic speech recognition, the method comprising the steps of receiving a speech signal, dividing the speech signal into time windows, for each time window, determining acoustic parameters of the speech signal within that window, and identifying speech features from the acoustic parameters, such that a sequence of speech features are generated for the speech signal, separating the sequence of speech features into a sequence of phonological segments, (Continued)

and comparing the sequential phonological segments to a stored lexicon to identify one or more words in the speech signal.

14 Claims, 10 Drawing Sheets

(51) Int. Cl.
*G10L 15/187* (2013.01)
*G10L 25/75* (2013.01)
*G10L 15/04* (2013.01)

(52) U.S. Cl.
CPC ........ *G10L 15/08* (2013.01); *G10L 2015/025* (2013.01)

(56) References Cited

U.S. PATENT DOCUMENTS

| | | | |
|---|---|---|---|
| 5,175,793 A | 12/1992 | Sakamoto et al. | |
| 5,623,609 A * | 4/1997 | Kaye .................. | G10L 15/04 704/1 |
| 7,680,663 B2 * | 3/2010 | Deng .................. | G10L 15/02 704/231 |
| 8,515,750 B1 | 8/2013 | Lei et al. | |
| 2016/0322046 A1 * | 11/2016 | Lahiri .................. | G10L 25/75 |

OTHER PUBLICATIONS

Aditi Lahiri et al. 'Underspecified recognition' Laborator Phonology 7, Jan. 1, 2002 pp. 637-675, Belin, New York.

Paul Taylor et al. 'Speech Recognition via Phonetically-Featured Syllables' Phonus: Reports in Phonetics, University of Saarland Jan. 1, 2000.

Stevens Kenneth N: 'Toward a model for lexical access based on acoustic landmarks and distinctive features' The journal of acoustical society of America, American Institute of Physics for the Acoustical of America. New York, NY Apr. 1, 2002.

Combined Search and Examination report issued in GB1322377.1 dated Jun. 19, 2014.

ISR and WO issued in PCT/IB2014/067023 dated Apr. 1, 2015.

EPO Form 2001 Dated Jan. 31, 2018.

* cited by examiner

FIG.12

METHOD AND APPARATUS FOR AUTOMATIC SPEECH RECOGNITION

This invention relates to a method of automatic speech recognition and an apparatus operable to carry out the method.

BACKGROUND TO THE INVENTION

Automatic speech recognition is a widely used technology, whose applications include dictation programs, caller menu programs for telephone systems, and voice responsive 'assistants' on mobile telephones.

A problem with such systems is the computational load required to move from the digitally encoded speech to identifying the actual words spoken. Commercial systems rely on statistical and template matching systems, in which a particular acoustic spectrum and its changes over time are matched to a known set of spectra or spectral characteristics. In these systems, Hidden Markov Models and other general-purpose pattern-finding algorithms are used. The system is trained on exemplars of real speech, and takes its best guess at what information from any given signal is relevant to the task of recognition. The disadvantage with such systems is that they require a great deal of processing, to match extremely information—rich spectra. Accordingly, dictation programs have to be trained to work effectively with a particular user's voice. Where this is not possible, such as in caller menu systems, to provide robust operation only a relatively limited range of possible responses are identifiable. Even then, conventional speech recognition systems may fail to correctly recognise speech with a strong regional or national accent, or where the speaker has a speech difficulty.

An alternative approach has been proposed, based on linguistic theory, in which individual phonological features are identified within the acoustic signal (see for example Lahiri, Aditi & Reetz, Henning, 2002. 'Underspecified recognition.' In Carlos Gussenhoven & Natasha Warner (eds.), Laboratory Phonology 7, 637-676, Berlin: Mouton de Gruyter). This approach is based on the fact that specific spoken sounds appear in the acoustic spectrum in identifiable ways, so that a section of spoken speech can be used to identify a sequence of features. However, this approach has not to date been effectively implemented.

SUMMARY OF THE INVENTION

According a first aspect of the invention there is provided a method of automatic speech recognition, the method comprising the steps of receiving a speech signal, dividing the speech signal into time windows, for each time window determining acoustic parameters of the speech signal within that window, and identifying phonological features from the acoustic parameters, such that a sequence of phonological features are generated for the speech signal, separating the sequence of phonological features into a sequence of zones, and comparing the sequences of zones to a plurality of lexical entries comprising sequential phonological segments in a stored lexicon to identify one or more words in the speech signal.

The acoustic parameters of the speech signal within each time window may comprise one or more of the root mean square amplitude, the fundamental frequency of the speech signal (F0), the frequency of one or more formants F1, F2, F3 in the speech signal and a spectrum of the speech signal. Each time window may be 20 ms.

When a spectrum of the speech signal is calculated, the method may further comprising determining an overall steepness value by calculating the slope of a regression line over the whole spectrum, a first steepness value by calculating the slope of a regression line over a first frequency range, and a second steepness value by calculating the slope of a regression line over a second frequency range.

The first frequency range may be from 300 Hz to 1500 Hz and the second frequency range may be from 1500 Hz to 5000 Hz.

The method may comprise determining that the [CONSONANTAL] feature is active if the overall steepness value >0 dB/Hz.

The method may comprise determining that the [SONORANT] feature is active if the overall steepness value >−0.015 dB/Hz.

The method may comprise determining that the [LOW] feature is active if the [SONORANT] feature is active and the frequency of the first formant F1 is >600 Hz.

The method may comprise determining that the [HIGH] feature is active if the [SONORANT] feature is active and the frequency of the first formant F1 is <450 Hz.

The method may comprise determining that the [CORONAL] feature is active if the [SONORANT] feature is active and the frequency of the second formant F2 is in the range 2000 Hz<F2<2750 Hz.

The method may comprise determining that the [DORSAL] feature is active if the [SONORANT] feature is active and the frequency of the second formant F2<1000 Hz.

The method may comprise determining that the [RTR] feature is active if the [SONORANT] feature is active and the frequency of the third formant F3 is <4000 Hz and the frequency of the first formant F1 is >400 Hz or the frequency of the second formant F2 is in the range 1300 Hz<F2<1500 Hz.

The method may comprise determining that the [OBSTRUENT] feature is active if the overall steepness value is <−0.015 db/Hz.

The method may comprise determining that the [HIGH] feature is active if the [OBSTRUENT] feature is active and the first steepness value minus the second steepness value is greater than 2.

The method may comprise determining that a pause feature is active if the root mean square amplitude value is below a threshold.

The method may comprise determining that the [PLOSIVE] feature is active if the [OBSTRUENT] feature is active and preceded by a pause feature.

The method may comprise determining that the [NASAL] feature is active if the frequency of the first formant F1 is in the range 100 Hz<F1<400 Hz, the bandwidth of the first formant is less than 300 Hz, the amplitude of the first formant F1 is more than 70 dB and the amplitude of the second formant F2 is less than 90 dB.

The method may comprise determining that the [LABIAL] feature is active if the frequency of the second formant F2 is in the range 700 Hz<F2<1200 Hz.

The method may comprise determining that the [STRIDENT] feature is active if the overall steepness is >0.1 db/Hz The method may comprise determining that the [VOCALIC] feature is active if the frequency of the first formant F1 is in the range 200 Hz<F1<1000 Hz and the bandwidth of the first formant is less than 500 Hz.

The method may comprise generating a sequence of phonological features by determining the phonological features active in each time window and outputting the speech features in chronological order.

The step of separating the sequence of phonological features into a sequence of zones may comprise determining an instability score for each time point in the sequence of phonological features, comparing the instability scores with an instability threshold and a minimum stable zone length, wherein a sequence of time points having a length greater than the minimum stable zone length and an instability score less than then instability threshold are determined to form a stable zone, such that features lying within the stable zone are deemed to be part of the same phonological segment.

A sequence of time points not in a stable zone and lying between stable zones may be determined to form unstable zones.

The minimum stable zone length may be 30 ms.

The instability score for a time point may be increased for each feature present in the preceding time point but not present in the time point.

The instability score for a time point may be increased for each feature present in the time point but not present in the preceding time point.

The instability score for a time point may be increased where the time point and the preceding time point comprise features forming mutually exclusive pairs.

Comparing the sequential phonological segments to lexical entries in a stored lexicon to identify one or more words in the speech signal may comprises the steps of, for a lexical entry comprising a description of a word in terms of phonological segments, matching the stable zones of the sequence of phonological segments to the phonological segments of the lexical entry, for each stable zone, determining a penalty for each feature depending on the features present in the matched phonological segment of the lexical entry, and calculating a matching score from the determined penalties.

The method may comprise determining a relatively large penalty for a feature in the stable zone if an incompatible feature is present in the matched phonological segment of the lexical entry.

The method may comprise determining a relatively small penalty for a feature in the stable zone where a feature in the stable zone is not present in the matched phonological segment of the lexical entry or vice versa.

No penalty may be determined for a feature in the stable zone if the same feature is present in the matched phonological segment of the lexical entry.

The penalty may be dependent on the fraction of the stable zone in which the feature is active.

An unstable zone penalty may be determined for each feature in an unstable zone depending on the features present in the matched phonological segments of the lexical entry aligned to the stable zone on each side of the unstable zone.

If a phonological segment of the lexical entry lies between the matched phonological segments of the lexical entry aligned to the stable zone on each side of the unstable zone, an unstable zone penalty may be determined for each feature in the unstable zone compared to that phonological segment.

The lowest unstable zone penalty may be selected to contribute to the matching score.

The method may comprise comparing the sequential phonological segments to a plurality of lexical entries and identifying a word from the lexical entry with the lowest matching score.

The method may comprise only comparing the sequential phonological segments to a lexical entry if the number of phonological segments in the lexical entry is within a limited range of the number of zones in the sequential phonological segments.

According to a second aspect of the invention there is provided an apparatus operable to perform a method according to any one of the preceding claims.

The apparatus may comprise a database storing a lexicon, the lexicon comprising a plurality of lexical entries, each lexical entry comprising a description of a word in terms of phonological segments.

The apparatus may be operable to receive a signal comprising a speech signal.

BRIEF DESCRIPTION OF THE DRAWINGS

An embodiment of the invention is described by way of example only with reference to the accompanying drawings, wherein;

FIGS. 9a to 9c are graphs showing penalties determined in the method of FIG. 8.

DETAILED DESCRIPTION OF THE PREFERRED EMBODIMENTS

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 1:
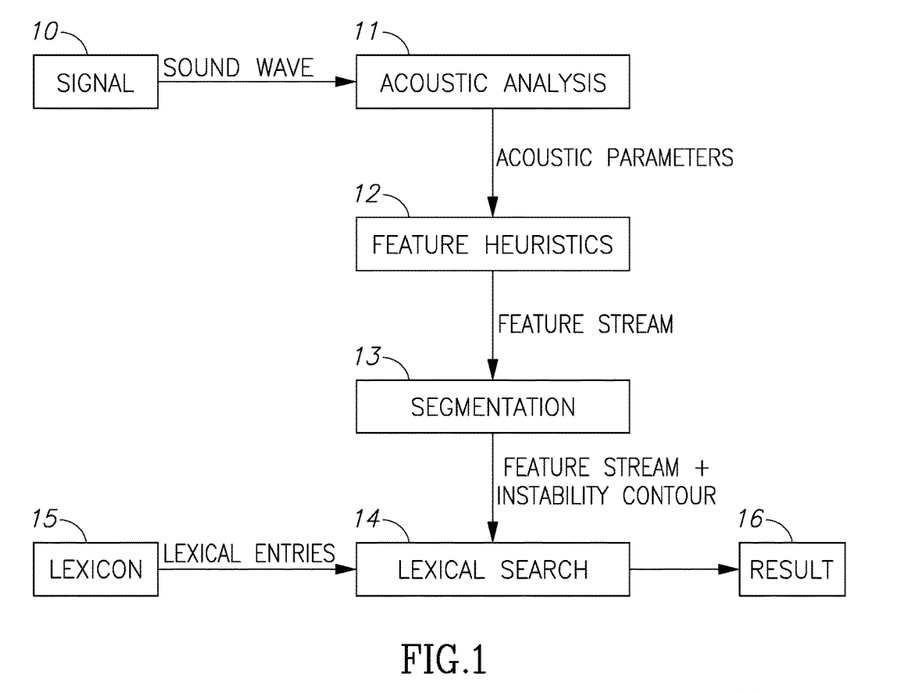
FIG. 1 is a flow path showing the complete method.

A method of automatic speech recognition is summarised in FIG. 1, and individual steps are expanded and discussed in more detail below. In FIG. 1, at step 10 a signal comprising a speech signal is received. The signal may be in any suitable format, and may be digitised or may comprise an analogue signal which is subsequently digitised before processing as discussed below. At step 11 acoustic analysis is performed, to identify various acoustic parameters of the speech signal and its spectrum. At step 12, the acoustic parameters are used to identify phonological features in the speech signal. The time sequence of phonological features is separated into segments corresponding to individual speech sounds at step 13. At step 14, the sequence of segments is compared with a lexicon 15 to identify a matching word, and the resulting match output at 16.

Figure 2:
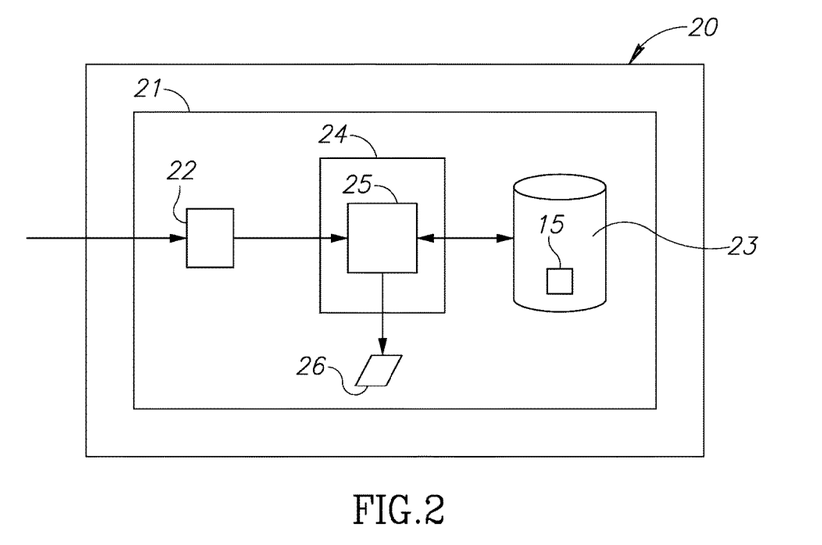
FIG. 2 is a diagrammatic illustration of an apparatus to perform the method.

A system to carry out the method is generally shown at 20 in FIG. 2. The system may be a personal computer, a part of a larger system such as a server, or implemented on a mobile device such as a telephone, by way of example. An apparatus generally shown at 21 includes an input/output element 22 to receive the speech signal. A data store 23 holds the lexicon 15, and a processing apparatus generally shown at 24 is operable to run program 25 to carry out the step shown in FIG. 1, and pass the output to output connection 26, which may for example be another system, another program on the same system or another module or component of program 25.

Figure 3:
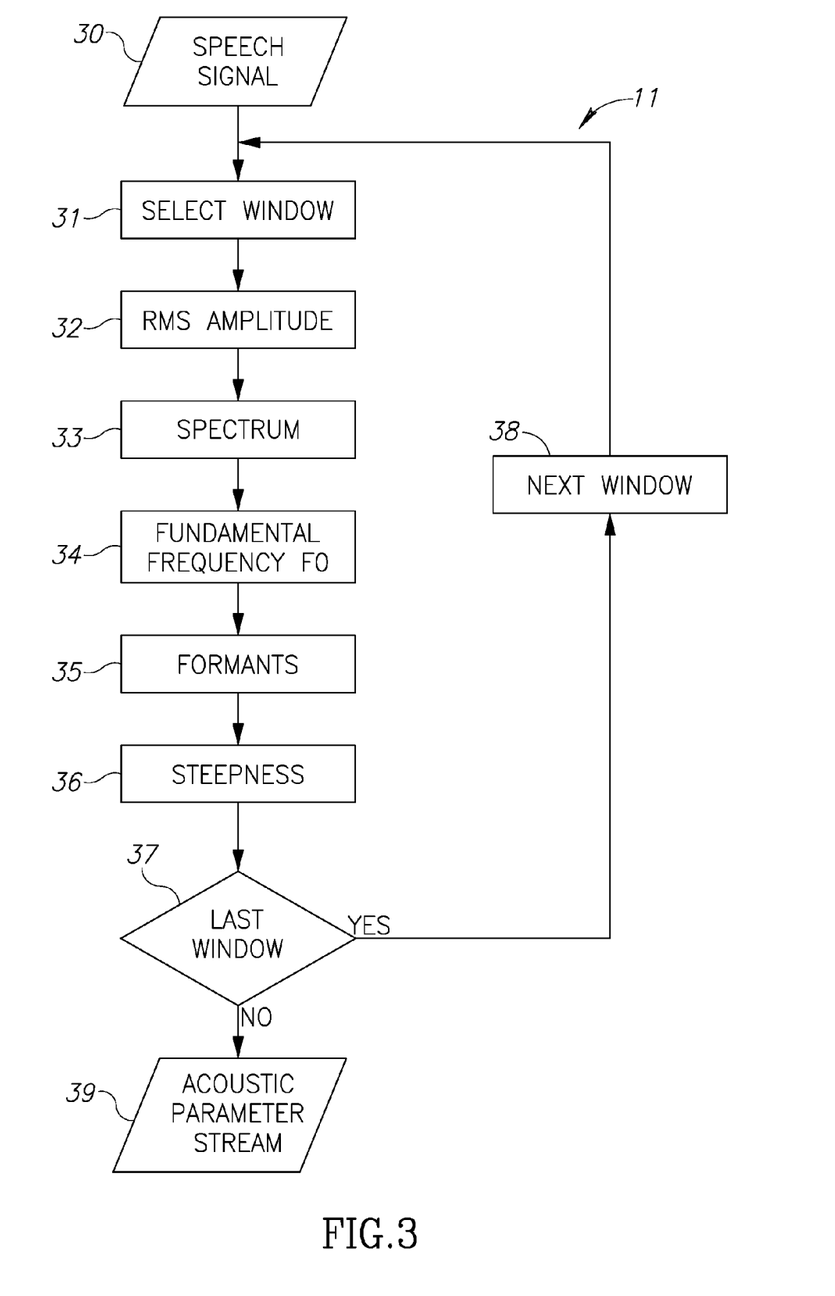
FIG. 3 is a flow chart show the acoustic analysis step of FIG. 1 in more detail.

As illustrated in FIG. 3, the acoustic parameters from a received speech signal are determined as follows. The speech signal is received at step 30 and is divided into a sequence of windows, in this example having a width of 20 ms, the start of each successive window being offset by 1 ms. Accordingly, the first window runs from 0 ms to 20 ms, the second from 1 ms to 21 ms, the third from 2 ms to 22 ms and so on. The window width and offset may be chosen to have different values if desired, for example depending on processing capability available, signal quality or otherwise.

Figure 4:
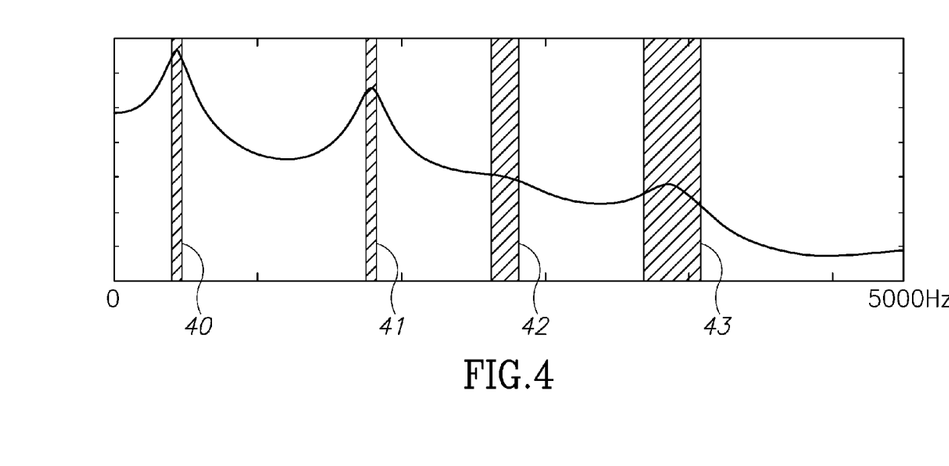
FIG. 4 is an example of an acoustic spectrum calculated during the acoustic analysis step of FIG. 1.
Figure 5:
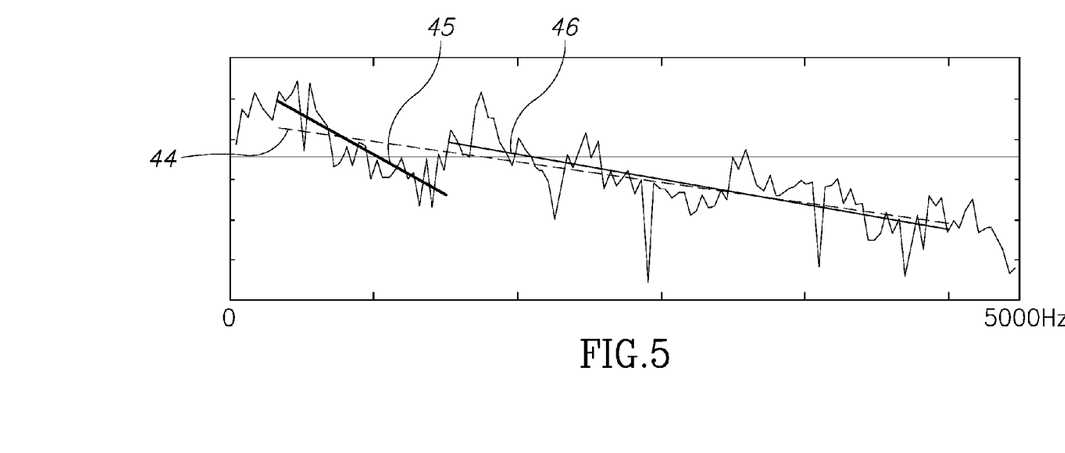
FIG. 5 is an example of a smoothed acoustic spectrum showing the location of the formants.

The first window is selected at step 31 and some or all of the following acoustic parameters are calculated:
  a) the root mean square amplitude of the samples in the window, which is a measure of how loud the signal is in the window (step 32).
  b) the spectrum of the signal in the window is calculated. Conveniently this can be performed using a fast Fourier transform (FFT) (step 33).
  c) the fundamental frequency of the waveform in the window is calculated. This can be derived from the spectrum, or can be calculated using an auto-correlation method. The fundamental frequency is a measure of the frequency with which the vocal folds are vibrating, which determines the overall pitch of the encoded speech (step 34).
  d) the frequency, bandwidth and amplitude of the first four formants, at step 35. The formants are principal resonant properties of the oral and nasal cavities, as expressed in the speech signal. When the vocal folds are vibrating, it is usually possible to detect four formants referred to as F1, F2, F3 and F4 in the speech signal. In the present example as discussed below, for recognition of English words only the first 3 formants are used, but all four formants may be needed for other languages. The formants are extracted from the spectrum by linear predictive coding in known manner. FIG. 4 is an example of a spectrum in which the formants have been identified. Formants F1 to F4 are indicated by bands 40 to 43 respectively.
  e) an overall steepness value which is the slope of a least-squares regression line over the whole spectrum computed at step (b) above, as shown at 44 in FIG. 5.
  f) a first steepness value which is the slope of a regression line over a first part of the spectrum, as shown at 45 in FIG. 5. In this example the first part of the spectrum extends from. 300 Hz to 1500 Hz.
  g) a second steepness value which is the slope of a regression line over a second part of the spectrum, as shown at 46 in FIG. 5. The overall steepness value, first steepness value and second steepness value are calculated at step 36.

Depending on the language with which the method is to be used, other acoustic parameters may be measured as appropriate.

In this example the second part of the spectrum extends from 1500 Hz to 5000 Hz. An example of a spectrum is shown in FIG. 4. The least squares regression line over the whole spectrum can be seen at 44, the regression line over the first part of the spectrum is shown at 45 and the regression line over the second part of the spectrum is shown at 46.

As shown at steps 37 and 38, the steps 31 to 36 are repeated for each window. When the acoustic parameters have been calculated for all windows, an acoustic parameter stream is output at 39. Accordingly, after step 11 of FIG. 1 it will be apparent that the information content of the speech signal has been reduced to a formant stream comprising values for a limited set of acoustic parameters, at discrete time points.

Figure 6:
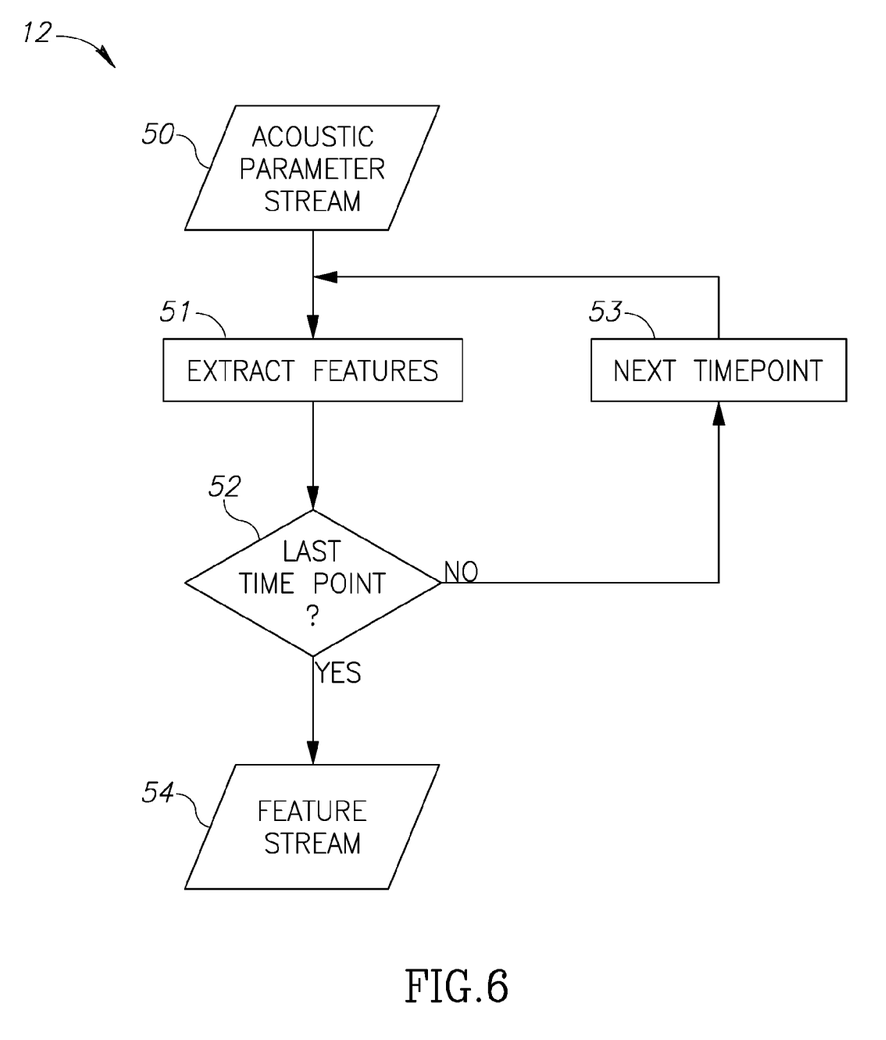
FIG. 6 is a flow chart showing the feature determination step of FIG. 1 in more detail.

At step 12 of FIG. 1, illustrated in FIG. 6, the acoustic parameters are used to determine the presence of phonological features at each time point. In known manner, phonological features are features corresponding to particular acoustic and articulatory characteristics of speech. At step 50, the acoustic parameter stream is received, and at step 51 the acoustic parameters corresponding to the first window are used to identify the presence of active phonological features using a plurality of tests criteria.

In this example, the following test criteria are used to determine which features are active;
  a) the [CONSONANTAL] feature is active if the overall steepness value >0 dB/Hz.
  b) the [SONORANT] feature is active if the overall steepness value >−0.015 dB/Hz.
  c) the [OBSTRUENT] feature is active if the overall steepness value is >−0.015 dB/Hz.
  d) the [LOW] feature is active if the [SONORANT] feature is active and the frequency of the first formant F1 is >600 Hz.
  e) the [HIGH] feature is active if the [SONORANT] feature is active and the frequency of the first formant F1 is <450 Hz.
  f) the [CORONAL] feature is active if the [SONORANT] feature is active and the frequency of the second formant F2 is in the range 2000 Hz<F2<2750 Hz.
  g) the [DORSAL] feature is active if the [SONORANT] feature is active and the frequency of the second formant F2<1000 Hz
  h) the [RTR] feature is active if the [SONORANT] feature is active and the frequency of the third formant F3 is <4000 Hz and either the frequency of the first formant F1 is >400 Hz or the frequency of the second formant F2 is in the range 1300 Hz<F2<1500 Hz.

i) the [PLOSIVE] feature is active if the [OBSTRUENT] feature is active and preceded by a pause feature. A pause feature is active if the root mean square amplitude value is below a threshold.

j) the [NASAL] feature is active if the frequency of the first formant F1 is in the range 100 Hz<F1<400 Hz, the bandwidth of the first formant is less than 300 Hz, the amplitude of the first formant F1 is more than 70 dB and the amplitude of the second formant F2 is less than 90 dB.

k) the [LABIAL] feature is active if the frequency of the second formant F2 is in the range 700 Hz<F2<1200 Hz.

l) the [STRIDENT] feature is active if the overall steepness is >0.1 db/Hz.

m) the [VOCALIC] feature is active if the frequency of the first formant F1 is in the range 200 Hz<F1<1000 Hz and the bandwidth of the first formant is less than 500 Hz.

In the present example, the method and apparatus are for use in recognising spoken English or German, and so the set of features listed above are identified. For other languages, other features may need to be identified, such as [CONTINUANT], [RADICAL], [RHOTIC], [SPREAD GLOTTIS], [LATERAL] or [ATR], and some of the features listed above may be unnecessary. For other languages, as part of identifying other features, it may be necessary to measure different acoustic parameters at steps 32 to 36. For example, for tonal languages and intonation contours, it may be necessary to measure the fundamental frequency F0 for pitch accents such as [H*] or [L*].

In addition, the test criteria may be varied as appropriate, and the frequency and steepness values given above are empirical examples. Ideally, the values should be selected to cover as much of the range within which the formant frequency or steepness may be expected to vary.

As shown by steps 52 and 53, the test criteria are applied to every time point in the acoustic parameter stream. When every time point has been tested, the resulting sequence is referred to as the feature stream, and output at step 54. It will be apparent that the speech signal has been thus reduced to a simple listing of the presence or absence of a limited set of phonological features at each discrete time point.

Although the method described herein is generally sequential, in that a complete step is performed and buffered before the results are passed on to the next step, it will be clear that the method may be a continuous process, such that each time point in the acoustic parameter stream may be tested and the resulting part of the feature stream passed to the segmentation step as described below, and so on through the complete method.

At step 13 of FIG. 1, the feature stream is classified into zones. Ideally, each zone would correspond to a specific phonetic sound. In practice however, zones are not clearly discrete, as successive zone can contain the same features, and features may not clearly turn on or turn off simultaneously at a zone boundary. The method described herein therefore relies on the identification of stable zones within the feature stream, within which all the time points can be regarded with confidence as belonging to the same segment.

Figure 7:
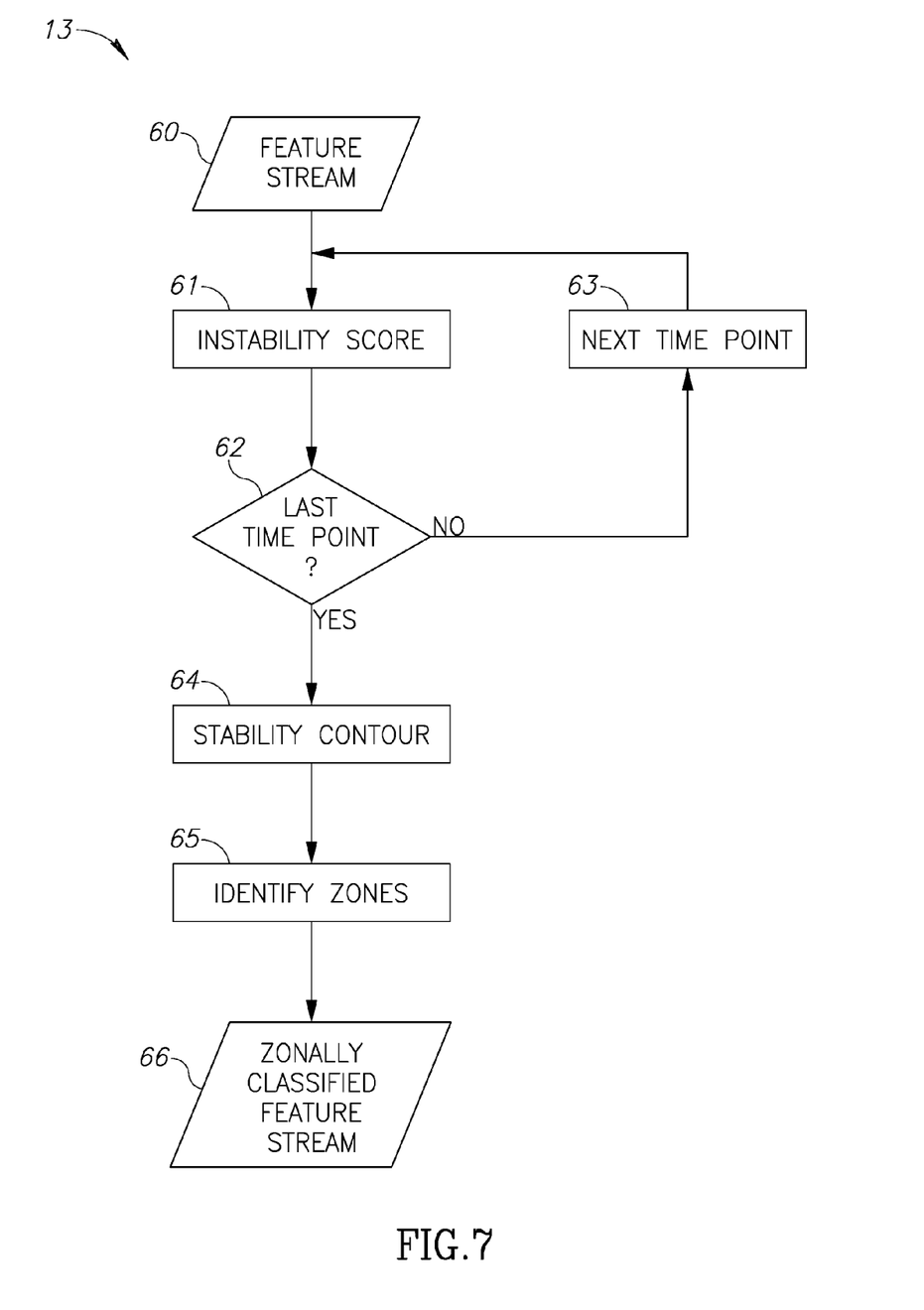
FIG. 7 is a flow chart showing the segmentation step of FIG. 1 in more detail.

To identify stable zones in the feature stream, the steps shown in FIG. 7 are carried out. Starting with the feature stream at step 60, for the first time-point in the feature stream an instability score is computed at step 61, by comparing the features extracted at that time-point with those at the time-points preceding, back to a configurable number of milliseconds (50 by default). As shown by steps 62, 63, an instability score is calculated for each window.

The instability score begins at zero and is incremented as follows. For each preceding time-point, the score is incremented:

i) by 1 for every feature that is present in the preceding time-point, but not in the time-point whose score is being computed.

ii) by a configurable value for every feature present in the current time-point, but not in the preceding one. This value is set to 5 by default, because a new feature appearing at the current time-point is more likely to indicate a new segment than a segment which has appeared before failing to show iii) by a different configurable value for every case where the current and preceding time-points collectively contain both features from one or more of the following mutually exclusive pairs: [CONSONONTAL/VOCALIC], [OBSTRUENT/SONORANT], [STRIDENT/NASAL] and [HIGH/LOW]. Because these features are mutually exclusive, switching from one of these features to the other is considered highly indicative of a new segment. In the present example this value is set to a high value, 25.

After an instability value has been calculated for each time point, the resulting sequence of instability values, illustrated at step 64, is referred to as the instability contour. At step 65, stable zones are identified using the instability contour. A sequence of time points having a length greater than a minimum stable zone length and instability score less than an instability threshold are determined to form a stable zone. The minimum stable zone length is preferably selected to be approximately that of the shortest possible steady-state segment, for example a vowel or a nasal consonant with a sustained glottal wave, or the sustained noise of a fricative. In the present example, the minimum stable zone length is 30 ms and the instability threshold is 400. Where a sequence of time points is determined to define a stable zone, features within the zone are considered to belong to the same phonological segment. At the beginning and end of every word, and in between stable zones lie unstable zones. Features within unstable zones are not discarded; instead, deciding which phonological segment they should align to is treated as part of the lexical search procedure.

Accordingly, after the zone classification step 13 is complete at step 66, the feature stream from step 12 has been divided into stable and unstable zones, now referred to as the zonally classified feature stream. No information is discarded, as unstable zones may represent valid phonological segments, and the process of deciding whether or not valid phonological segments are present is performed as part of step 14, the lexical matching step.

The lexicon matching step 14 proceeds by assigning a matching score to possible lexical entries which may conform to the segmented feature stream from step 13, and selecting the lexical entry with the best matching score as the matched word. The lexical matching step is discussed in more detail with reference to FIG. 8.

Figure 8:
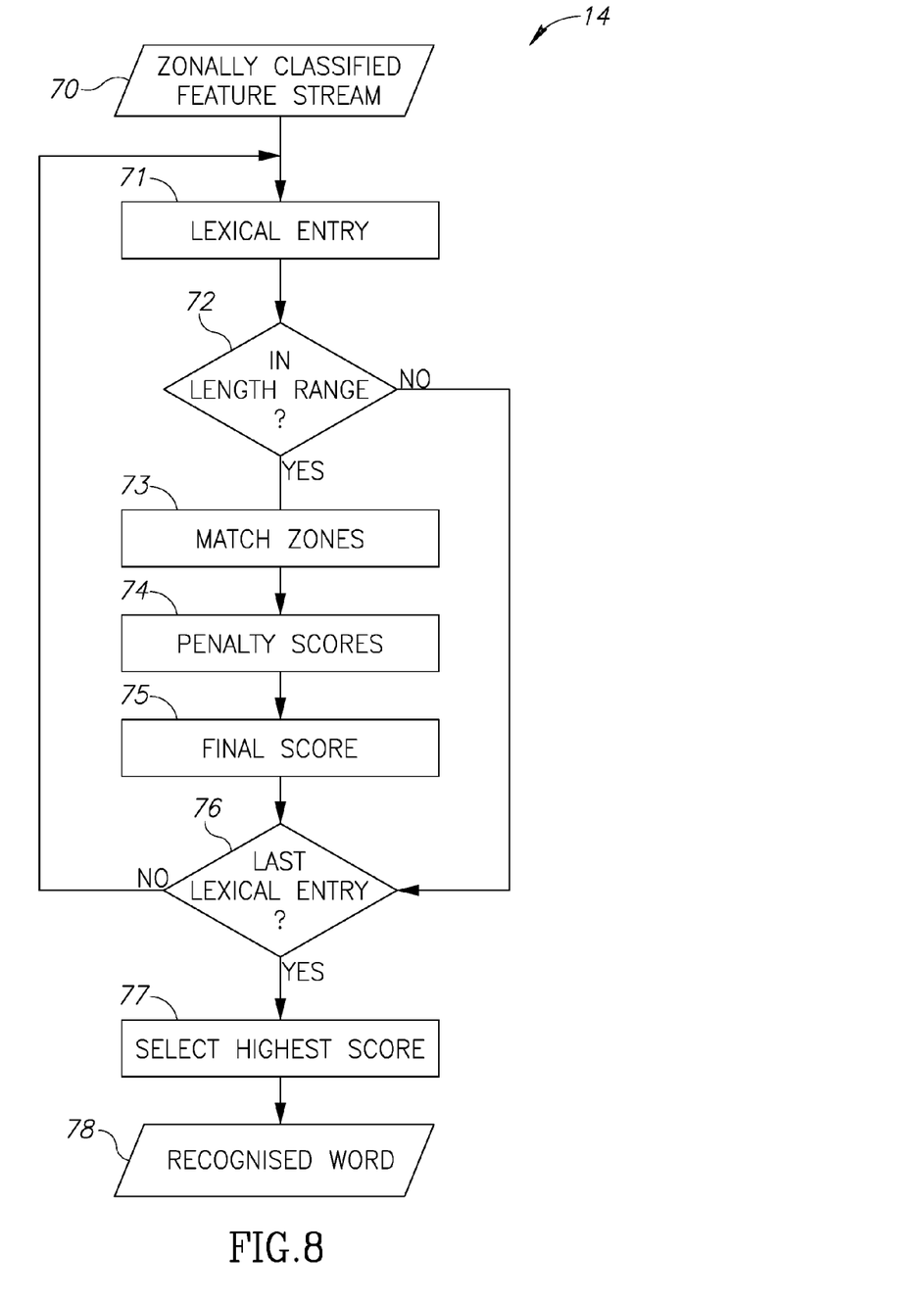
FIG. 8 is a flow chart showing the matching step of FIG. 1 in more detail.

At step 70, the zonally classified feature stream is received and a lexical entry selected at step 71. In the matching step, only those lexical entries with a number of phonological segments in the lexical entry within a limited range of the number of zones in the sequential phonological segments are tested, and this is checked at step 72. In the present method, the range is from the number of stable zones minus a range parameter to the number of zones, whether stable or unstable, plus the range parameter. In this example the range parameter is 2. The zonally classified feature stream has four stable zones and four unstable zones, so only those lexical entries with from 2 to 10 zones are tested.

The range parameter may be varied, or be different at the two ends of the range. It might be envisaged that each lexical entry has a phonological segment count stored in the lexicon 15, and only those lexical entries with a phonological segment count in the limited range are compared to the zonally-classified feature stream.

If the lexical entry length is within the acceptable range at step 72, then at step 73, to compare the zonally-classsified feature stream to the lexical entry, the stable zones in the zonally-classified feature stream are matched to their best phonological segment matches in the lexical entry. Any suitable optimal matching algorithm may be used, in this example the Needleman-Wunsch algorithm.

Penalty scores are then calculated at step 74 by comparing the features in the stable zones to the features in the matched lexical entry segments. Each feature in each zone is compared.

A relatively large mismatch penalty is determined for a feature in the stable zone if an incompatible feature is present in the matched phonological segment of the lexical entry. Incompatible features in the zonally-classified feature stream and lexical entry are shown in the table below.

| Zonally-classified feature stream feature | Incompatible lexical entry feature |
| --- | --- |
| [CONS] | [VOC] |
| [VOC] | [CONS] |
| [LOW] | [HIGH] |
| [HIGH] | [LOW] |
| [NASAL] | [STRIDENT] |
| [STRIDENT] | [NASAL] |
| [CORONAL] | [CONSONANTAL, LABIAL] |
| [CORONAL] | [DORSAL] |
| [DORSAL] | [CONSONANTAL, LABIAL] |
| [LABIAL] | [CONSONANTAL, DORSAL] |
| [PLOSIVE] | [NASAL] |

A relatively small no-mismatch penalty is determined for a feature in a stable zone where a feature in the stable zone is not present in the matched phonological segment of the lexical entry or vice versa. A match penalty is determined for a feature in the stable zone if the same feature is present in the matched phonological segment of the lexical entry. Preferably, the penalty is dependent on the fraction of the stable zone in which the feature is active.

Figure 9A:
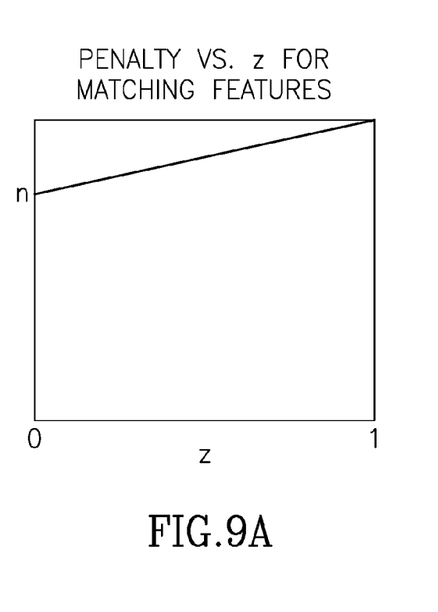
Figure 9B:
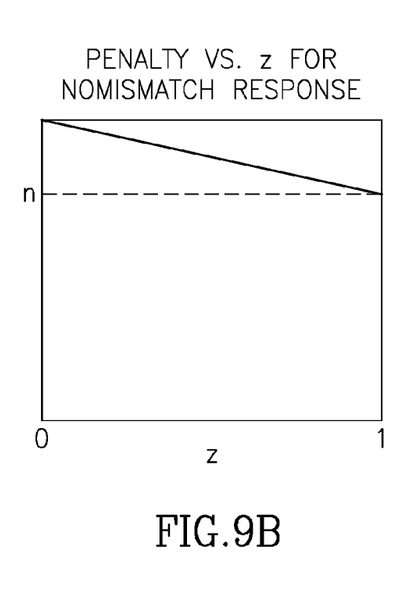
Figure 9C:
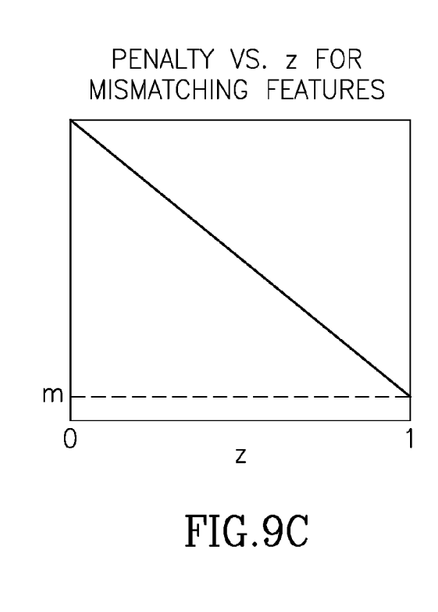

In this example, the penalty is calculated as follows. For a features which extends across a proportion z of a stable zone;
 a) if the zonally-classified feature stream feature is present in the lexical entry segment, the penalty is given by $l+z(1-l)$ where l is the match penalty,
 b) if the zonally-classified feature stream feature is not present in the lexical entry segment, the penalty is given by $1-z(1-n)$, where n is the no-mismatch penalty, and
 c) if the zonally-classified feature stream feature is incompatible with a lexical entry feature in the matched lexical entry segment, the penalty is given by $1-z(1-m)$, where m is the mismatch penalty, The values are preferably selected so that m is much lower than n, as a mutually incompatible pair of features is much more indicative of a wrong lexical entry. In the present example, $n=0.95$ and $m=0$, while $l=n$. If a feature is present in the lexical entry but not in the zonally-classified feature stream segment, the penalty is calculated as in case (a) for $z=0$, that is the penalty for a feature being present in the lexical entry segment but not in the zonally-classified feature stream segment is the same as a feature being present in the zonally-classified feature stream segment but not in the lexical entry segment. The variation of the penalties calculated for z across the range 0 to 1 are shown in FIGS. 9a to 9c respectively, corresponding to cases (a) to (c) above. The penalties are in the range 0 to 1, where 1 indicates a perfect match and 0 represents completely incompatible features.

For an unstable zone, the features in the unstable zone are compared with the features of the lexical segment aligned with the stable zone immediately to the left of the unstable zone, the lexical segment aligned with the stable zone immediately to the right of the unstable zone, and compared to any lexical segments falling in between the two segments already considered. The scores for each comparison are calculated using criteria (a) to (c) above, and the lowest score selected. It will be apparent this process is advantageous in that potentially useful information is not discarded. An unstable zone may be matched to adjacent zones, and regarded as purely a continuation of a stable segment, or may be matched to a segment of a lexical entry not already identified as matching a stable zone.

Finally, length mismatches between the zonally-classified feature stream and lexical entry are penalised. For each extra stable zone in the zonally-classified feature stream in excess of the number of segments in the lexical entry, penalty s is added. Penalty s is also determined for each segment of the lexical entry to which no feature of the zonally-classified feature stream has been matched.

The logarithm of each penalty is calculated, and at step 75 the logarithm values added to give a final penalty score. The final penalty score is essentially a measure of the quality of the match between the zonally-classified feature stream and the lexical entry compared to a notional perfect match. At step 76, if the lexical entry is not the final entry to be checked, then process steps 71 to 75 are repeated.

After all appropriate lexical entries have been checked, then at step 77 the lexical entry with the highest score is selected as the best match, and output at step 78.

The method is illustrated with reference to a particular example in FIGS. 10 to 12. The spoken word is 'swordfish', the segments of which are represented using the International Phonetic Alphabet as /sɔːdfɪʃ/. In terms of phonological features, the features of the segments of the lexical entry are as follows;
 /s/ [CONS, OBS, STRID, CONT]
 /ɔ/ [VOC, SON, DOR, LAB]
 /d/ [CONS, OBS, VOI]
 /f/ [CONS, OBS, STRID, CONT, LAB]
 /ɪ/ [VOC, SON, HIGH, RTR]
 /ʃ/ [CONS, OBS, CONT, HIGH, STRID]

Figure 10:
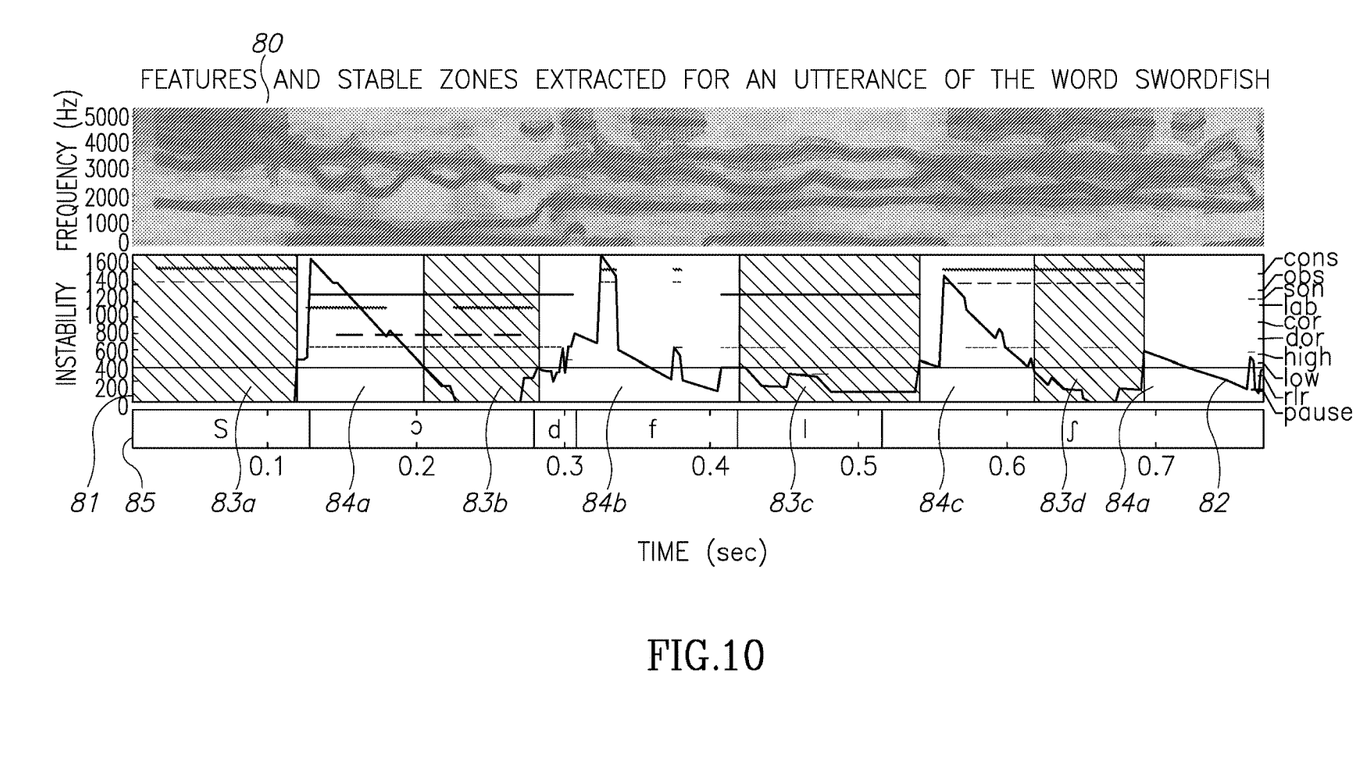
FIG. 10 shows a speech signal spectrum over time and a corresponding zonally-classified feature stream after feature determination and segmentation.

In the top graph 80 of FIG. 10, the evolving spectrum of the speech signal is shown, plotted at 20 ms time intervals. The frequency range is 0 to 5500 Hz and darker bands are higher amplitude frequencies.

The lower graph 81 of FIG. 10 shows the identification of specific features in the speech signal, as carried out in step 12. The presence of a feature is shown by a horizontal line, corresponding to the particular feature listed at the right-hand axis. It will be apparent that not all of the features corresponding to each lexical segment are identified, in particular [VOC] and [STRID].

Also plotted on the lower graph of FIG. 10 is an instability contour 82 calculated as described in step 13. Stable zones are shown by grey bands 83a, 83b, 83c, 83d and unstable zones shown in white bands 84a, 84b, 84c, 84d. In unstable zones 84a and 84c, the instability value shows a sharp peak and then declines evenly, representing an abrupt change and then relative stability. In contrast, unstable zone 84b shows a number of peaks, suggesting a number of possible segments within the zone.

The bottom band 85 of FIG. 10 shows the actual duration of each segment in the speech signal for comparison.

Figure 11:
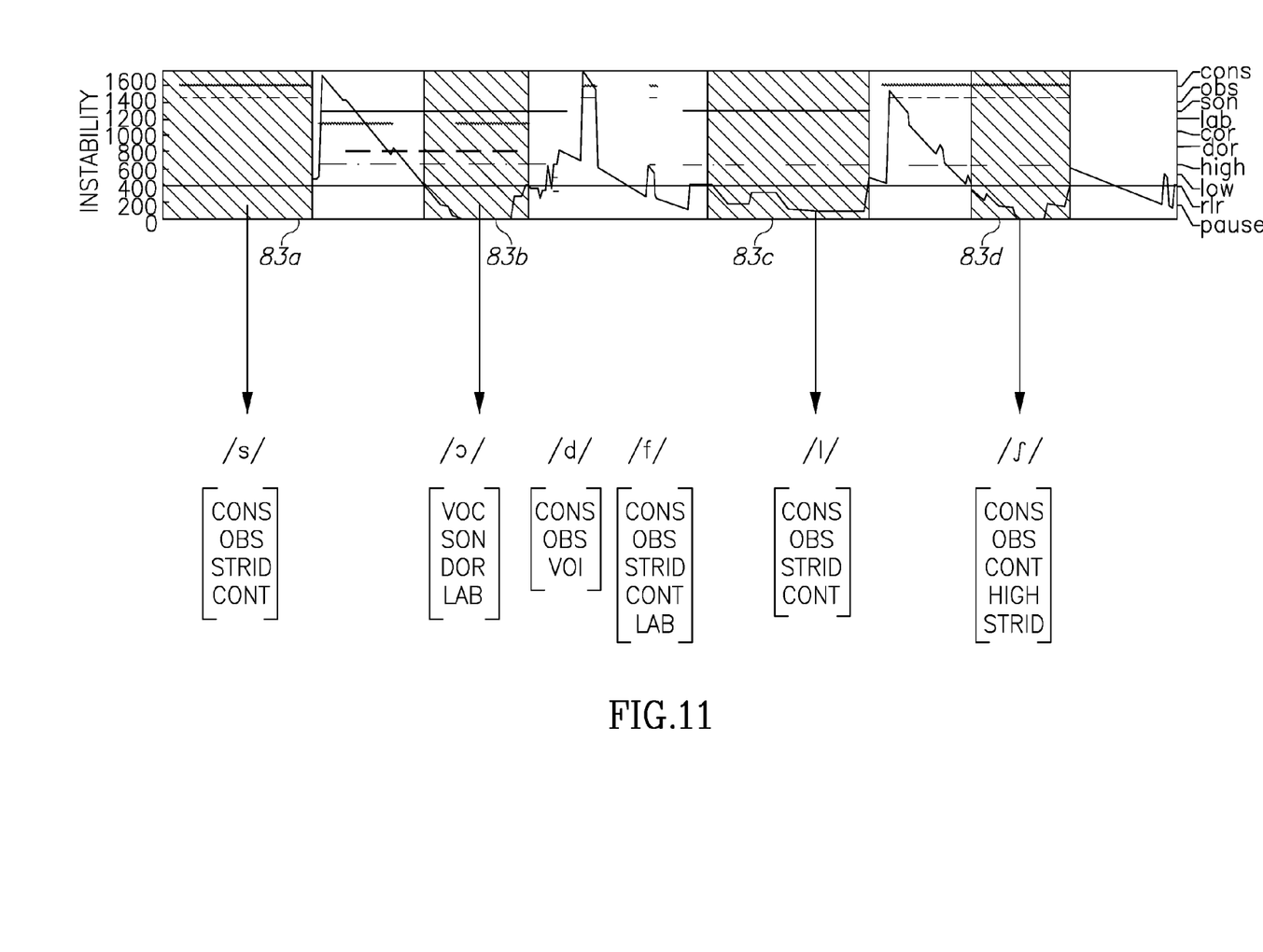
FIG. 11 shows the speech signal of FIG. 10 during the matching process with phonological features matched to stable zones.

In FIG. 11, the zonally-classified feature steam is compared with the lexical entry for 'swordfish'. The best-match algorithm matches /s/, /ɔ/, /ɪ/ and /ʃ/ to the four stable zones 83a, 83b, 83c, 83d, of course leaving /df/ unmatched. In the stable zones, it will be apparent that the features in the zonally-classified feature stream extend over the majority of the zone and correspond to the features of the corresponding lexical entry segment. From penalty calculation (c) above, a relatively low penalty will be assessed for the stable zones.

In this example, it will be noted that the vowel identified is /ɔ/ without the length mark. The method described herein only uses the defining features to identify a segment without reference to the length of the segment. It might be envisioned that the length of a zone, relative to the average length of a zone, might be used as a phonetic cue to assist in identifying a segment. For example, a long zone might indicate a segment corresponding to a long vowel such as /ɔ:/. An exceptionally long stable zone may also be identified as corresponding to successive identical segments.

Figure 12:
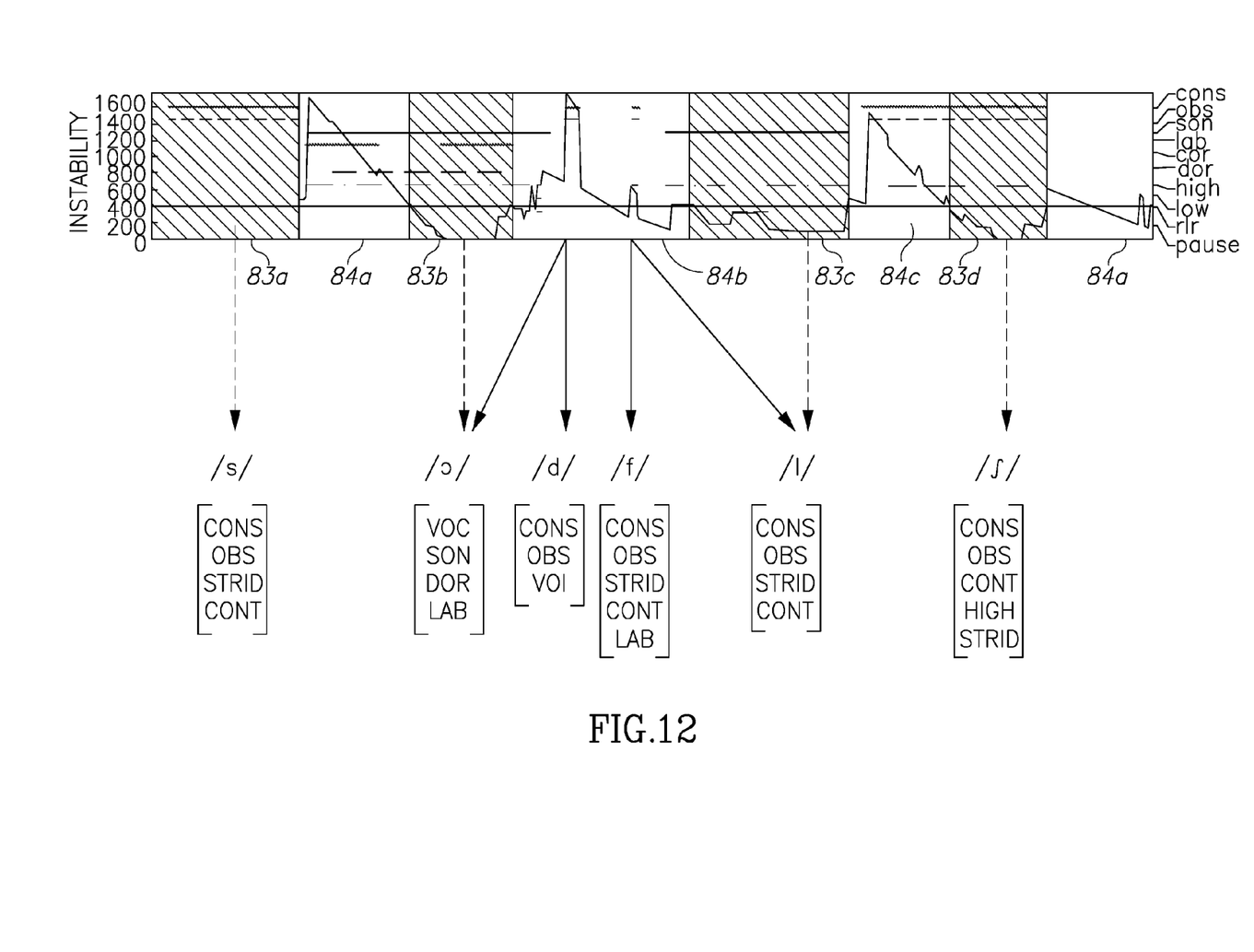
FIG. 12 shows the speech signal of FIG. 10 with final phonological features matched to all zones.

FIG. 12 illustrates the step of matching the unstable zones 84a, 84b, 84c, 84d. The established stable zone matches are shown by dashed arrows. The unstable zones 84a and 84c are compared to the features of the lexical entry segments matched to the adjacent stable zones. In each case, the features correspond to the features of the stable zone to the right and will generate a low penalty score, suggesting that the unstable zone and stable zone are part of the same segment.

In the case of unstable zone 84b the features in the zone are compared to the lexical entry segments matched to stable zones 83b and 83c as shown by solid arrows, and also the unmatched lexical entry segments falling between the segments matched to the two stable zones. The lowest penalty score is associated with the match with segment /d/.

No penalty for the number of zones is assessed, as there are fewer stable zones in the segmented feature stream than in the lexical entry, but a penalty will be determined for segment /f/ as this was not matched to a zone, having received a worse score than /d/ when matched to unstable zone 84b. The final identification of zones and segments is illustrated in FIG. 12.

The method described herein is advantageous in many ways. It has been unexpectedly found to be robust even when the speaker has a speech impediment, a regional accent or is a non-native speaker of the language being recognised. The method is computationally lightweight, needing only a fraction of the spectral and acoustic data to recognise a word compared to known voice recognition methods. The lexicon itself can be compact, needing only to class each potential word or lexical entry in terms of a short sequence of small sets of phonological features, and, as described above, it is not even essential to identify every possible phonological feature associated with the target language. It will be apparent that the method is very simply adapted to other languages, by adjusting the phonological features identified in step 12 and providing a lexicon for that language.

Although particular method steps are described above, it will be clear that many of the steps may be performed in different orders, concurrently or otherwise, as required by a particular implementation, program or system.

In the above description, an embodiment is an example or implementation of the invention. The various appearances of "one embodiment", "an embodiment" or "some embodiments" do not necessarily all refer to the same embodiments.

Although various elements of the invention may be described in the context of a single embodiment, the elements may also be provided separately or in any suitable combination. Conversely, although the invention may be described herein in the context of separate embodiments for clarity, the invention may also be implemented in a single embodiment.

Furthermore, it is to be understood that the invention can be carried out or practiced in various ways and that the invention can be implemented in embodiments other than the ones outlined in the description above.

Meanings of technical and scientific terms used herein are to be commonly understood as by one of ordinary skill in the art to which the invention belong, unless otherwise defined.

The invention claimed is:

1. A method of automatic speech recognition, the method comprising the steps of;
   receiving a speech signal,
   dividing the speech signal into time windows,
   for each time window:
   determining acoustic parameters of the speech signal within that window, and
   identifying phonological features from the acoustic parameters,
   such that a sequence of phonological features are generated for the speech signal,
   separating the sequence of phonological features into a sequence of zones,
   and comparing the sequence of zones with lexical entries comprising sequences of phonological segments in a stored lexicon to identify one or more words in the speech signal,
   wherein the step of separating the sequence of phonological features into a sequence of zones comprises:
   determining an instability score for each time point in the sequence of phonological features,
   comparing the instability scores with an instability threshold and a minimum stable zone length,
   wherein a sequence of time points having a length greater than the minimum stable zone length and an instability score less than then instability threshold are determined to form a stable zone, such that features lying within the stable zone are deemed to be part of the same phonological segment,
   wherein an instability score for a first time point is increased for each feature present in a preceding time point but not present in the first time point and/or wherein an instability score for a second time point is increased for each feature present in the second time point but not present in a preceding time point and/or wherein an instability score for a third time point is increased where the third time point and a preceding time point comprise phonological features forming mutually exclusive pairs.

2. A method according to claim 1 wherein the acoustic parameters of the speech signal within each time window comprise one or more of;
   the root mean square amplitude,
   the fundamental frequency of the speech signal;
   the frequency of one or more formants F1, F2, F3 in the speech signal;
   a spectrum of the speech signal.

3. A method according to claim 2 wherein each time window is 20 ms.

4. A method according to claim 2 wherein a spectrum of the speech signal is calculated, the method further comprising determining;
an overall steepness value by calculating the slope of a regression line over the whole spectrum,
a first steepness value by calculating the slope of a regression line over a first frequency range, and
a second steepness value by calculating the slope of a regression line over a second frequency range optionally wherein the first frequency range is from 300 Hz to 1500 Hz and the second frequency range is from 1500 Hz to 5000 Hz.

5. A method according to claim 1 comprising generating a sequence of phonological features by determining speech features active in each time window and outputting the speech features in chronological order.

6. A method according to claim 1 wherein a sequence of time points not in a stable zone and lying between stable zones are determined to form unstable zones.

7. A method according to 1 wherein the minimum stable zone length is 30 ms.

8. A method according to claim 1 wherein comparing the sequence of zones to lexical entries in a stored lexicon to identify one or more words in the speech signal comprises the steps of;
for a lexical entry comprising a description of a word in terms of phonological segments:
matching the stable zones to the phonological segments of the lexical entry,
for each stable zone, determining a penalty for each feature depending on the features present in the matched phonological segment of the lexical entry,
and calculating a matching score from the determined penalties.

9. A method according to claim 8 comprising determining a relatively large penalty for a feature in the stable zone if an incompatible feature is present in the matched phonological segment of the lexical entry comprising a description of a word in terms of phonological segments, optionally determining a relatively small penalty for a feature in the stable zone where a feature in the stable zone is not present in the matched phonological segment of the lexical entry comprising a description of a word in terms of phonological segments and /or wherein no penalty is determined for a feature in the stable zone if the same feature is present in the matched phonological segment of the lexical entry comprising a description of a word in terms of phonological segments.

10. A method according to claim 8 comprising comparing the sequence of zones to a plurality of lexical entries and identifying a word from the lexical entry with the lowest matching score.

11. A method according to claim 10 comprising only comparing the sequence of phonological segments to a given lexical entry if the number of phonological segments in the given lexical entry is within a limited range of the number of zones in the sequence of phonological segments.

12. An apparatus operable to perform a method according to claim 1.

13. An apparatus according to claim 12 comprising a database storing a lexicon, the lexicon comprising a plurality of lexical entries, each lexical entry comprising a description of a word in terms of phonological segments, and/or wherein the apparatus is operable to receive a signal comprising a speech signal.

14. A non-transitory computer readable medium encoded with instructions for causing a computer to carry out an operation, the operation comprising:
receiving a speech signal,
dividing the speech signal into time windows,
for each time window:
determining acoustic parameters of the speech signal within that window, and
identifying phonological features from the acoustic parameters,
such that a sequence of phonological features are generated for the speech signal,
separating the sequence of phonological features into a sequence of zones, and
comparing the sequence of zones with lexical entries comprising sequences of phonological segments in a stored lexicon to identify one or more words in the speech signal,
wherein the step of separating the sequence of phonological features into a sequence of zones comprises:
determining an instability score for each time point in the sequence of phonological features, and
comparing the instability scores with an instability threshold and a minimum stable zone length,
wherein a sequence of time points having a length greater than the minimum stable zone length and an instability score less than then instability threshold are determined to form a stable zone, such that features lying within the stable zone are deemed to be part of the same phonological segment,
wherein an instability score for a first time point is increased for each feature present in a preceding time point but not present in the first time point and/or wherein an instability score for a second time point is increased for each feature present in the second time point but not present in a preceding time point and/or wherein an instability score for a third time point is increased where the third time point and a preceding time point comprise phonological features forming mutually exclusive pairs.

* * * * *